United States Patent [19]
Beitz et al.

[11] Patent Number: 6,042,855
[45] Date of Patent: Mar. 28, 2000

[54] USE OF VITAMIN D, ITS METABOLITES AND ANALOGS TO IMPROVE TENDERNESS OF MEAT AND MEAT PRODUCTS

[75] Inventors: Donald C. Beitz; Allen Trenkle, both of Ames; Frederick C. Parrish, Nevada, all of Iowa; Jayden L. Montgomery, Lubbock, Tex.; Ronald L. Horst, Ames, Iowa

[73] Assignees: United States of America (USDA); Iowa State University Research Foundation, Inc., both of Ames, Iowa

[21] Appl. No.: 08/883,865

[22] Filed: Jun. 27, 1997

[51] Int. Cl.[7] .............................. A23L 1/30; A21D 6/00; A01N 45/00
[52] U.S. Cl. ................................ 426/73; 426/73; 426/72; 426/248; 426/311; 514/167; 552/653; 556/552; 424/524; 204/157.6
[58] Field of Search ......................... 554/57; 435/240.31; 426/73, 72, 248, 311; 514/167; 552/653; 556/552; 424/524; 204/157.6

[56] References Cited

U.S. PATENT DOCUMENTS 5,533,836  7/1996  Moore ................................ 435/240.31
5,550,262  8/1996  Iqbal et al. ................................ 554/57

FOREIGN PATENT DOCUMENTS 799892  10/1997  European Pat. Off. ........ C12N 15/57

OTHER PUBLICATIONS

Koohmaraie M, The role of Ca(2+)–dependent proteases–(calpains) . . . , Biochimie, 74 (3) pp. 239–245, 1992.
Koochmaraie M, Effect of calcium chloride infusion on the tenderness . . . , J. Anim. Sci., 69(9), pp. 2463–2471, 1991.
Cena et al, Proteolytic activity of . . . , Z. Lebensm.–Unters. Forsch., 194(3) pp. 248–251, 1992.
Kodentsova et al., Vitamin D effects on calcium–stimulated . . . , Proc. Workshop Vitamin D, 7th p. 762, 1988.
Walentynowicz et al., Pathogenesis of heart myofibril . . . , Exp. Mol. Pathol. 63(3) pp. 200–209, 1995.
Yamanoue, Myofibrillar structure weakening wth tenderness . . . , Rakuno Kagaku, 43(5) a95–a100, 1994.
De Boland et al., Effects of Vitamin d3 on . . . , Biochimica et Biophysica Acta, 733(2) pp. 264–273, 1983.

*Primary Examiner*—Keith D. MacMillan
*Assistant Examiner*—Vickie Kim
*Attorney, Agent, or Firm*—Zarley, McKee, Thomte, Voorhees & Sease

[57] ABSTRACT

A method of improving the tenderness of meat and meat products is described. The method includes administering excessive doses of vitamin D to meat producing animals prior to slaughter. The vitamin D causes greater calcium activated calpain activity which degrades certain myofibrillar proteins in the meat postmortem. The resulting meat has a significantly lower shear force in comparison to untreated meat.

17 Claims, 1 Drawing Sheet

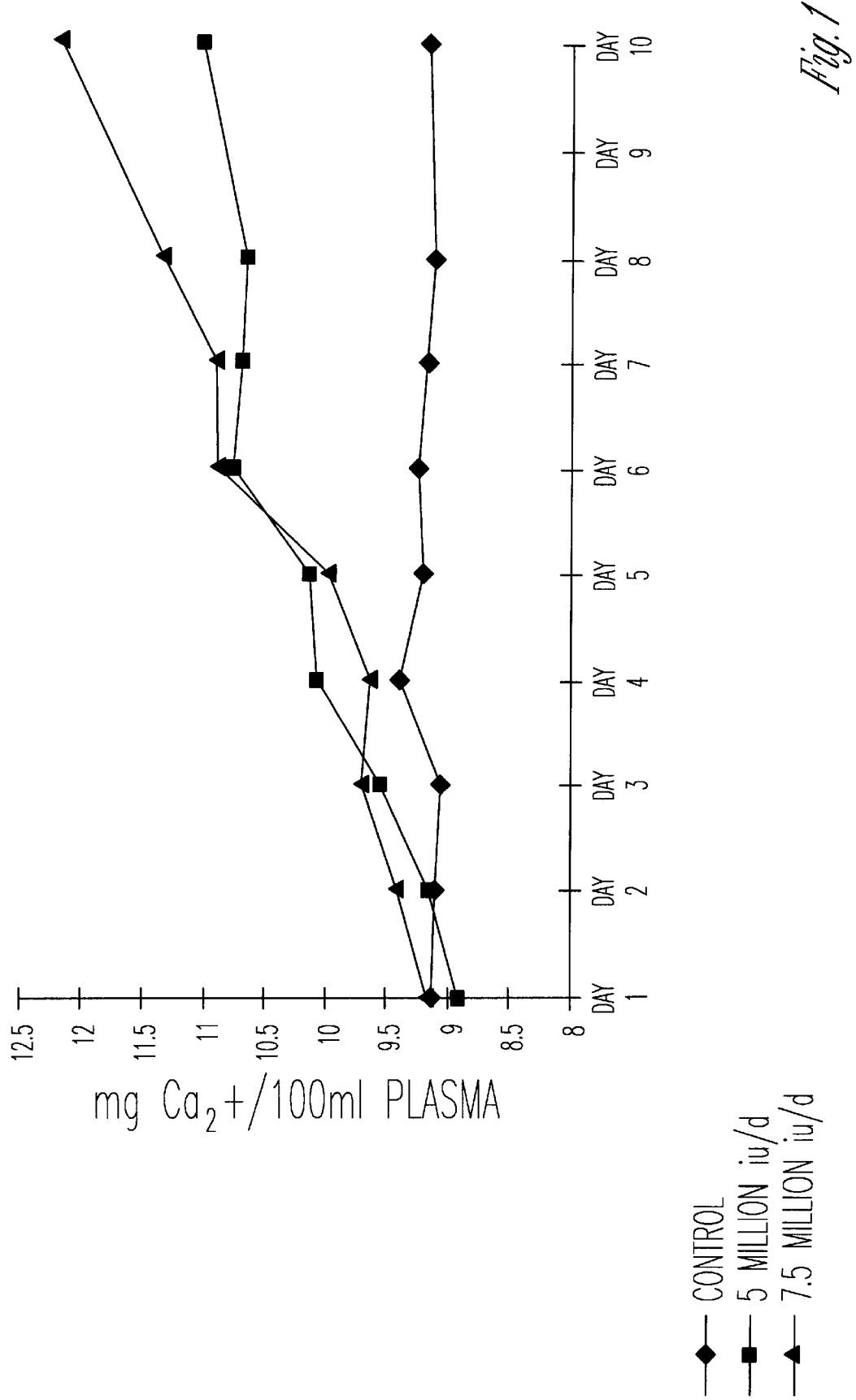

USE OF VITAMIN D, ITS METABOLITES AND ANALOGS TO IMPROVE TENDERNESS OF MEAT AND MEAT PRODUCTS

FIELD OF THE INVENTION

The present invention relates to a method and means of increasing meat tenderness through vitamin D supplementation prior to harvesting the meat.

BACKGROUND OF THE INVENTION

One of the major challenges of the beef industry is to provide a consistently tender product for consumers. Tenderness has been identified as the single most important factor affecting consumers' satisfaction and perception of taste (Morgan et al., 1991; and Savell et al., 1987 and 1991).

As consumers have become more conscious of the nutritional content of the foods they eat, the beef industry has been striving to produce a leaner meat product to satisfy the demands of consumers for low-fat beef. However, studies indicate that this lowering of the fat content of beef has been made at the sacrifice of taste. It has been suggested that, as the amount of subcutaneous fat in beef is reduced, intermuscular and intramuscular fat are lowered, causing an increased variation in meat palatability. Smith, G. C. et al. 1987. "Relationship of USDA quality grades to palatability of cooked beef." J. Food Qual. 10:269. Thus, tenderness, the sensory trait most affecting consumer acceptance of beef, is unacceptably inconsistent. Morgan, J. B., et al. 1991, "Using calcium chloride injection to improve tenderness of beef from mature cows," J. Animal Sci. 69:4469. In 1990, the National Beef Tenderness Survey indicated that over 20% of rib steaks, 40% of chuck steaks/roasts, and 60% of round steaks/roasts were slightly tough or tougher (Morgan et al., 1991).

Means for improving the tenderness of meat has included calcium chloride injection or infusion in prerigor meat. See e.g. Morgan et al., 1991. Similarly, postrigor injection of $CaCl_2$ has been used as another means for improving meat tenderness. Kerth, C. R. 1995. Improvement of beef tenderness and quality traits with calcium chloride injection in beef loins 48 hours postmortem. J. Anim. Sci. 73:750–756. The objective of the administration of exogenous $CaCl_2$ is to activate $\mu$ and m-calpain, which are calcium dependent proteases (Goll et al., 1992; and Koohmaraie, 1992).

Active calpains degrade muscle proteins during postmortem aging of beef. The degradation of muscle proteins, especially titin and nebulin, has been associated with improved beef tenderness (Huff-Lonergan et al., 1995). These proteins influence meat tenderness due to their unique large size, structural properties, position in the myofibril, interactions with other key proteins in the sarcomere, and their purported roles in myofibril integrity (Robson et al., 1991; and Huff-Lonergan et al., 1996).

Through the action of calcium-dependent ATPase, the cytosolic calcium concentration of muscle cells is maintained at about 0.1 $\mu$M, which is less than the Km values of the two calpains or calcium-activated proteases in skeletal muscles. The concentration of calcium in blood is maintained by a group of regulatory hormones called parathyroid hormone (PTH), calcitonin, and 1,25-dihydroxyvitamin D. The latter hormone is synthesized from 25-hydroxyvitamin D in the kidneys, which is synthesized from vitamin D in the liver. The cumulative effect of actions of 1,25-dihydroxyvitamin D is the significant elevation of calcium concentration in blood and of the mitochondria. Furthermore, large intakes of vitamin $D_3$ will increase blood calcium markedly via actions of additional 1,25-dihydroxyvitamin D (Horst and Littledike, 1979).

Recent research has indicated that skeletal muscle is an important target organ for vitamin $D_3$ (Boland and Nemere, 1992; Matthews et al., 1977). Vitamin $D_3$ has been shown to increase uptake and transport of calcium by the mitochondrial and sarcoplasmic membranes of rachitic chick skeletal muscle (Boland, 1985; Boland et al., 1983a; and Bygrave, 1978). 1,25-dihydroxyvitamin D and 25-hydroxyvitamin D have been reported to increase calcium uptake and cyclic AMP levels, and stimulate the phosphorylation of several membrane proteins including those which calmodulin binding capacity potentates in skeletal muscle (Boland and Boland, 1985; and Massheimer et al., 1990). Vitamin $D_3$ has been shown to increase the phospholipid composition of the sarcoplasmic reticulum and mitochondria of rachitic chick skeletal muscle (Boland et al., 1983b). Thus, vitamin $D_3$ increased calcium transportation has been related to the $Ca^{2+}$ pump and not to increased permeability of the membrane by lowering the Km and increasing the Vmax (Boland et al., 1983a).

Skeletal muscles are made of numerous muscle fibers. Each muscle fiber contains several hundred to several thousand myofibrils. Each myofibril in turn has, lying side by side, about 1500 myosin filaments and 3000 actin filaments, which are large polymerized protein molecules that are responsible for muscle contraction. The actin filaments attach to a Z disc, which passes from myofibril to myofibril, attaching the myofibrils to each other all the way across the muscle fiber. The portion of a myofibril that lies between two successive Z discs is called a sarcomere.

Extracellular (blood), mitochondrial, and sarcoplasmic reticular calcium is in the millimolar range. The calcium-dependent ATPases maintain concentration of calcium in the cytosol of muscle cells so that it is about one ten-thousandth that of the surrounding compartments. Koohmaraie et al., 1987, found that it is $\mu$-calpain, not m-calpain, which plays an important role in the fragmentation of myofibrils and in the improvement of meat tenderness resulting from postmortem storage at refrigerated temperatures. This is most likely due to the high concentration requirement of $Ca^{2+}$ for m-calpain to be activated. It has been reported that if only one in every 250 sarcomeres of a myofibril was broken, a significant improvement in tenderness could occur (Marsh, 1981). If all of the $\mu$-calpains present were maximally active almost all of the z-disks which lie at the ends of the sarcomeres would be degraded, a change that is not associated with postmortem aging (Koohmaraie et al., 1986; and Koohmaraie, 1984).

The instant inventors have found that feeding meat producing animals vitamin D, rather than treating the meat with calcium chloride postmortem, is a more effective means of tenderizing meat due to increased $\mu$-calpain and possibly m-calpain activity in fragmenting myofibrils.

It is therefore a primary objective of the present invention to provide a novel means for improving tenderness of meat and meat products.

It is a further objective of the present invention to provide a means for improving tenderness of beef which does not affect the flavor of the beef.

It is still a further objective of the present invention to provide a means for improving tenderness of meat and meat products which is safe and cost effective.

The method and means of accomplishing each of the above objectives as well as others will become apparent from the detailed description of the invention which follows hereafter.

SUMMARY OF THE INVENTION

The invention describes a method and means for improving the tenderness of meat through the administration of vitamin D, (lack of subscript implies either vitamin $D_3$ a.k.a. cholecalciferol or vitamin $D2$ a.k.a. ergocalciferol) its prodrugs, metabolites and analogues, to meat producing animals prior to slaughter. Administering excessive doses of vitamin D to meta producing animals causes increased calcium activated calpain activity to certain myofibrillar proteins. The result is decreased shear values in meat and improved meat tenderness.

As used herein the term "vitamin D" is intended to include vitamin D, ($D_3$ a.k.a. cholecalciferol or vitamin $D_2$ a.k.a. ergocalciferol) its prodrugs, its metabolites, its analogs or any other compound conferring vitamin D activity as disclosed in the following references the disclosure of which are hereby incorporated in their entirety by reference: Bouillon, R.; Okamura, W. H.; Norman A. W.; "Structure, Function, and Relationships in Vitamin D Endocrine Systems" Endocrinology Reviews Vol. 16 pgs. 200–257 (1995) and Horst, R. L. and Reinhardt, T. A. "Vitamin D metabolism" Vitamin D Feldman D., Glorieux F., Pike, J. W. (eds.) Academic Press San Diego, Calif. (in press).

Feeding meat producing animals excessive doses of vitamin D provides the advantage of reducing the variation in tenderness of meat products that are normally present. The vitamin D is distributed to various muscles throughout the animal carcass. Also, vitamin D supplementation can be easily and economically implemented in a commercial feeding system.

BRIEF DESCRIPTION OF THE DRAWINGS

FIG. 1 is a graph showing plasma calcium levels of steers administered vitamin $D_3$ prior to slaughter.

DETAILED DESCRIPTION OF THE INVENTION

The present invention discloses a method of improving the tenderness of animals wherein excessive doses of vitamin D are fed to cattle prior to slaughter. In practice, several days prior to slaughter, meat producing animals are fed excessive amounts of vitamin D.

In a preferred embodiment the meat producing animal is cattle and the meat is beef.

The active vitamin D factor in bone ossification and the maintenance of blood calcium levels is 1,25-dihydroxy vitamin D.

In the liver, vitamin D is hydroxylated by a 25-hydroxylase associated with the endoplasmic reticulum. Complexed to a specific plasma protein, the 25-hydroxycholecalciferol is carried to the kidneys. There is further hydroxylated to the hormonally active form of 1,25-dihydroxycholecalciferol.

The present invention contemplates the use of not only 1,25-dihydroxy vitamin D, but also its prodrugs which metabolize to the compound and the analogues and biologically active salt forms thereof, as well as optical isomers which provide the same pharmaceutical results. Examples of acceptable forms of vitamin D for use in the present invention include, but are not limited to, vitamin $D_3$, which is also known as natural vitamin D or cholecalciferol; vitamin $D_2$ or ergocalciferol, which is a plant form of vitamin D); 25-dihydroxyvitamin D and 1,25-dihydroxy vitamin D. Vitamin $D_3$ is the preferred form.

The vitamin D must be fed to the animal several days before slaughter for an amount of time and in a concentration sufficient so that the animal has plasma calcium levels at the time of death which are able to initiate increased calpain activity postmortem. The inventors have found that plasma calcium levels remain elevated for one to two weeks after administering vitamin D. Thus, vitamin D supplementation can be discontinued up to two weeks prior to slaughter. According to the invention plasma levels of approximately 11 to 13 mg/100 ml plasma are usually sufficient to achieve the desired effects. This amounts to about $1.7 \times 10^3$ I.U. per kilogram of body weight per animal.

Once the animal is slaughtered, the calcium activation of calpains causes degradation of the myofibrillar proteins in the meat, thereby tenderizing the meat. The excessive vitamin D doses can be administered for any number of days or weeks prior to slaughter. However, for economic reasons, the animals should only be fed for the minimum number of days necessary to provide the excessive blood levels of calcium for post mortem activity. Usually this is about 5–8 days prior to slaughter. The vitamin D can be given each day in feed or in one bolus dose per day or can be separated into several doses. For convenience, it is preferred to give the dose once daily, since there is no harm to the animal in doing so.

In a preferred embodiment the animals are cattle and the meat is beef. In order to cause increased activation of the calpains postmortem, cattle must have a plasma calcium concentration in the range of from about 11 to 13 mg/100 ml plasma. The dose of vitamin D necessary to achieve this range is from about 1 to 7.5 million international units (I.U.) per day. The preferred dose is 5–7.5 million I.U. per day, with 5 million I.U. per day being most preferred.

The inventors have found that cattle given a dose of 7.5 million I.U. of vitamin D provides no advantage to giving a dose of 5 million I.U. since there is no difference in the tenderness of the meat with the higher dose. Thus, 5 million I.U. is the preferred dose for economic reasons. The dose can be given through standard means, including orally, intravenously, etc.

Cattle which are fed these excessive doses of vitamin D exhibit a substantial decrease in the shear force of their steaks. On average, beef steaks show a 0.40 kilogram decrease in shear force. Although not specifically tested, it is expected that treatment in accordance with the present invention will also improve the tenderness of the tougher steaks and roasts from the round and chuck.

Typically, the tenderness of steaks with finer fibers, such as strip steaks from the longissimus dorsi (LD), is dependent upon the amount of time they are aged postmortem, i.e. LD steaks aged 14 days postmortem are more tender than LD steaks aged only 3 days. Steaks with coarser muscle fibers, such as semimembranosus (SM) of the top round, have not demonstrated this time-dependent trend.

Vitamin D is an inexpensive vitamin and can be conveniently provided to cattle in their normal feed. Thus, for a minor cost, a vitamin D supplementation system can be easily implemented in a feedlot system. While its cost is minor, the supplementation method of the present invention provides great benefits to the marketability of the beef produced. Further, providing cattle with excessive doses of vitamin D does not alter the palatability of the meat produced, unlike previous postmortem treatment methods using calcium chloride.

The following examples are presented to aid in the understanding of the invention. They are not intended to limit the invention in any manner.

EXAMPLE 1

Treatment of Steers with Vitamin $D_3$

10 Days Prior to Slaughter

Thirty crossbred finishing steers, predominantly of continental-breed-types were randomly allotted to three treatment groups consisting of a placebo for the 10 control animals, 5 million I.U. of vitamin $D_3$ for 10 animals and 7.5 million I.U. of vitamin $D_3$ for the last 10 animals. The steers had been purchased the previous spring and allotted to pastures in May. At this time each steer was implanted with Ralgro. In June they were put into a dry lot and fed Bermseen Clover green chop. All 30 steers were started on a high concentrate finishing ration in October at which time the steers were reimplanted with Ralgro. The finishing ration consisted of 78.2% whole shell corn, 14.2% alfalfa hay, 4.1% soybean meal on a dry matter basis, and 3.5% of a 40% liquid supplement consisting of 13.1% crude protein of 0.61 mega cal of net energy for gain per pound. All steers were fed the finishing ration ad labium December through February.

In February the 30 steers were moved to an open dry lot at the Iowa State University Veterinary Resource Farm where they were fed a high concentrate diet of rolled whole corn and oats plus a supplement. Calves also had free access to a mixed grass hay and water. There was a small covered shelter with bedding for the animals to lie under. After two weeks steers were allotted at random from weight and breed outcome groups to the three treatment groups. Ten days prior to slaughter, steers were sorted using a cattle chute and jugular punctured for blood samples. After bleeding each steer was administered a bolus consisting of a gelatin capsule filled with ground corn (placebo) for the control animals plus 5 million I.U. of vitamin $D_3$ (treatment 1) or 7.5 million I.U. of vitamin $D_3$ (treatment 2). Bolusing and bleeding occurred in the morning prior to feeding and lasted eight consecutive days. On day ten all steers were transported to a commercial slaughter plant and slaughtered that day.

Three days after slaughter (postmortem day 3) carcasses were fabricated and packaged in Cryovac® (Cryovac, Duncan, S.C.) anaerobic vacuum bags. Striploins and top rounds were retained for the experiment. Steaks were cut 2.54 cm-thick for Warner-Bratzler shear force determinations, sensory panels, and myofibril fragmentation indexing. Steaks were vacuum packaged in Cryovac B160 beef bags and stored at 1° C. for postmortem wet aging.

Calcium Testing

Plasma Calcium. Blood samples were collected prior to bolusing each animal each morning of bolusing at 24 hour intervals and at slaughter. Blood samples were placed in heparinized centrifuge tubes, stored on ice, and centrifuged at 1500 RPM for 20 minutes, one hour after collection. Plasma was stored at −18° C. until analyzed for calcium. Quantitation of plasma calcium was done by atomic absorption spectrometry. Six replicates were averaged per sample for each day's blood collection.

Muscle Calcium. One gram muscle samples were taken from 14 days postmortem LD and SM steaks. Samples were dried and then ashed at 525° C. in a muffle furnace. Ashes were solubilized in 10 ml 6 N HCl. Calcium was quantified using atomic absorption spectrometry.

Warner-Bratzler Shear Force Determination

Steaks from the longissimus dorsi (LD) of the striploin and semimembranosus (SM) of the top round cut 2.54-cut-thick were aged 3, 7, 14, and 21 days at 1° C. for all steers. All steaks were broiled in a General Electric (Chicago Heights, Ill.) Model CN02 industrial broiler set at a temperature of 288° C. The surfaces of the steaks were approximately 10.16 cm from the heating element. The steaks were turned when they reached an internal temperature of 380° C. and were removed from the heat at an internal temperature of 71° C. Six 1.27-cm-diameter cores were removed parallel to the muscle fiber direction, two each from the central, medial, and lateral portions of each of the steaks. Cores were sheared perpendicular to the fiber direction through the center of the core using a Warner-Bratzler Shear device attached to an Instron Universal Testing Device (model 4502) controlled with a Model 4500 computer assist module (Instron, Canton, Mass.). Peak shear force values were recorded as kilograms per 1.27-cm-diameter core. The six cores per steak were averaged and the means were analyzed.

Sensory Evaluations

Sensory evaluations were conducted for 14 days postmortem LD strip steaks. Fourteen days postmortem steaks had been previously frozen and thawed to 1° C. 24 hours prior to cooking. The sensory panel was composed of 15 experienced and trained panelists from the faculty and staff at Iowa State University. Panelists had been previously trained (Cross et al., 1978; and AMSA, 1995). Steaks were broiled to an internal temperature of 71° C. in the same manner as the shear force steaks. Steaks were cut and mixed for each steak, and two pieces were selected at random for each panelist (AMSA, 1995). Samples were identified with a three digit code and served to panelists in aluminum tins under red fluorescent lighting. Samples were served hot, shortly after cooking. Panelists made evaluations for tenderness, juiciness, flavor intensity, and overall palatability. The scales were eight point scales, where 8 was extremely tender, extremely juicy, extremely intense, and extremely palatable, respectively, and 1 being extremely tough, extremely dry, extremely bland, and extremely unpalatable, respectively. Panelists were allowed to cleanse their palate with unsalted crackers and distilled water at room temperature in between samples.

Myofibril Fragmentation Index (MFI) Short Method

Fourteen days postmortem LD and SM samples which had been previously frozen were thawed out at 1° C. for MFI testing. A 0.64 cm section slice from the muscles was taken. Three 1.27-cm-diameter cores from the medial, central, and lateral portions were then taken. Cores were finely scissor minced and pieces of connective tissue and fat were removed. Four grams of sample were taken from each steak and blended in a Waring blender for 30 seconds with 40 ml of 2° C. isolating medium. The isolating medium consisted of 100 mM KCl, 20 mM potassium phosphate, 2 mM $MgCl_2$, 1 mM ETGA, and 1 mM $NaN_3$ at a pH range of 6.85 to 6.90. The 40 ml solution was then poured into a centrifuge tube and kept in an ice bath. Samples were then strained with the aid of a stir rod. Next, a dilution of the sample and isolating medium, using 0.25 ml of stirred (10 seconds) sample and 9.75 ml of 2° C. isolating medium were prepared in duplicate. The samples were once again kept on ice when not handled. The MFI was determined by stirring the sample through (10 seconds) and reading a Spectronic 20 (Bausch and Lomb) at 540 nm. Calculations of MFI value=reading× 200. Blanks of the isolating medium were also run.

Statistical Analysis

Data was analyzed as a split plot completely randomized design. Statistical Analysis System-GLM (SAS Institute, Inc., 1994) was used in determining means, standard deviations, least significant difference (LSD, $p<0.05$) between means. Thus, a calf represented an experimental unit.

Results

Each plasma calcium treatment mean was significantly different (P<0.001) from each other. Treatment means became different (P<0.05) from each other at day 5 and remained significantly different throughout the remainder of the experiment (see FIG. 1).

The calcium content of the longissimus control cattle was 0.255 mg of calcium per gram; that for the same muscle of cattle given 5 million I.U. of vitamin $D_3$ was 0.338 mg per gram and for cattle given 7.5 million I.U., 0.289 mg calcium per gram. The supplemental vitamin $D_3$ significantly (P<0.10) increased the calcium content of beef when given at 5 million I.U. per day to cattle for eight days before slaughter.

Excessive amounts of vitamin $D_3$ significantly decreased LD Warner-Bratzler treatment means (see Table 1). Also, day 14 postmortem wet, aged LD steaks had shear forces which were lower ($p \leq 0.0015$) than control steaks by almost half a kg. Also, 14 days aged LD steaks were more tender than 3 days aged steaks, while 21 aged steaks had slightly higher shear forces than 14 days aged LD steaks (Table 1).

Day 14 aged SM steaks treated with excessive amounts of vitamin $D_3$ had lower shear forces ($p \leq 0.0366$) than control steaks by over half a kg (see Table 2). Shear treatment means for vitamin $D_3$ treated cattle had significantly lower shear forces than control SM steaks (Table 2). While LD steaks had a significant time effect SM steaks lacked this trend, possibly because SM muscle fibers tend to be coarser in comparison and are more variable. This possibility is supported in the fact that SM steaks had slightly larger standard deviations indicating greater variation.

The above experiments indicate that administering excessive amounts of vitamin $D_3$ to continental cross-bred steers short-term prior to slaughter improved the tenderness of strip and top round steaks.

The experiments conducted showed an approximate 0.40 kg decrease in the shear force of LD and SM steaks from treated animals. Therefore, feeding massive doses of vitamin $D_3$ improves the tenderness of various muscles within a beef carcass. This reduces the variation in beef thereby increasing consumer acceptance for beef. Also, the results of these experiments indicate since all of the meat is tenderized with vitamin D administration, the tenderness of steaks and roasts from the round and chuck are also improved.

There was no difference in tenderness between the 7.5 million I.U. of vitamin $D_3$/day treated cattle and the cattle treated with 5 million I.U. of vitamin $D_3$/day. The data therefore indicates that feeding the lower level of 5 million I.U. of vitamin $D_3$/day is more cost effective than feeding 7.5 million I.U. of vitamin $D_3$/day.

TABLE 1

Effect of excess amounts of vitamin $D_3$ administered to steers ten days prior to slaughter on Warner-Bratzler shear force values of strip steaks.

| | Vitamin $D_3$ Treatments | | | | | | Aging |
|---|---|---|---|---|---|---|---|
| | Control | | 5 million IU/d | | 7.5 million IU/d | | Mean |
| | Shear force, kg | SD | Shear force, kg | SD | Shear force, kg | SD | P > F | Shear force, kg |
| Postmortem, d | | | | | | | | |
| 3 | 3.58 | .56 | 3.11 | .58 | 3.17 | .48 | .1638 | 3.29[a] |
| 7 | 3.32 | .28 | 3.20 | .61 | 2.89 | .52 | .1873 | 3.14[ab] |
| 14 | 3.25[d] | .30 | 2.80[o] | .26 | 2.78[o] | .45 | .0015 | 2.94[b] |
| 21 | 3.38 | .35 | 2.90 | .53 | 3.02 | .42 | .1071 | 3.10[c] |
| Treatment Mean | 3.38[d] | | 3.00[o] | | 2.97[o] | | .0001 | |

[abc]Means in the same column with a common superscript letter do not differ (P > .05)
[do]Means in the same row with a common superscript letter or no superscript letter do not differ (P > .05)

TABLE 2

Effect of excess amounts of vitamin $D_3$ administered to steers ten days prior to slaughter on Warner-Bratzler shear force values of top round steaks.

| | Vitamin $D_3$ Treatments | | | | | | Aging |
|---|---|---|---|---|---|---|---|
| | Control | | 5 million IU/d | | 7.5 million IU/d | | Mean |
| | Shear force, kg | SD | Shear force, kg | SD | Shear force, kg | SD | P > F | Shear force, kg |
| Postmortem, d | | | | | | | | |
| 7 | 3.97 | .72 | 3.56 | .63 | 3.32 | .55 | .0685 | 3.61 |
| 14 | 3.91[a] | .47 | 3.37[b] | .43 | 3.37[b] | .46 | .0366 | 3.55 |

TABLE 2-continued

Effect of excess amounts of vitamin $D_3$ administered to steers ten days prior to slaughter on Warner-Bratzler shear force values of top round steaks.

| | Vitamin $D_3$ Treatments | | | | | | | Aging |
|---|---|---|---|---|---|---|---|---|
| | Control | | 5 million IU/d | | 7.5 million IU/d | | | Mean |
| | Shear force, kg | SD | Shear force, kg | SD | Shear force, kg | SD | P > F | Shear force, kg |
| 21 | 3.74 | .32 | 3.32 | .55 | 3.56 | .51 | .1973 | 3.54 |
| Treatment Mean | 3.87[a] | | 3.42[b] | | 3.42[b] | | .0003 | |

[a,b]Means in the same row with a common superscript letter or no superscript letter do not differ (P > .05)

The above disclosure therefore demonstrates that the use of supplemental doses of vitamin D prior to slaughter will improve tenderness of grain-fed cattle.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. A method of improving the tenderness of meat and meat products, comprising:
   administering vitamin D to a meat producing animal prior to slaughter.

2. A method according to claim 1 wherein the vitamin D is administered in an amount sufficient to increase $\mu$-calpain activity during postmortem aging of said meat.

3. A method according to claim 2 wherein the vitamin D is administered in an amount sufficient to increase the plasma concentration of said animal to between about 11 to 13 mg calcium per 100 ml plasma.

4. A method according to claim 1 wherein said animal is cattle and said vitamin D is administered in a dose of from about 5 million to 7.5 million I.U. per day.

5. A method according to claim 4 wherein the vitamin D is administered in a dose of about 5 million I.U. per day.

6. A method according to claim 1 wherein the administration of vitamin D begins ten days prior to slaughter.

7. A method according to claim 1 wherein the vitamin D is vitamin $D_3$.

8. A method according to claim 1 wherein the vitamin D is administered orally.

9. A tenderized meat product comprising:
   meat harvested from a meat producing animal; and from about 0.3 to 0.4 grams of calcium per gram of meat;
   wherein said meat has a shear value of less than about 3.6 kg.

10. A tenderized meat product according to claim 9 wherein the meat product is selected from the group consisting of the longissimus dorsi of the striploin and the semimembranosus of the top round.

11. The meat product of claim 9 wherein said meat product is beef.

12. A meat product produced by the method of:
    administering vitamin D to a meat producing animal prior to slaughter.

13. The meat product of claim 12 wherein said vitamin D is administered to said meat producing animal to achieve a plasma concentration of 11 to 13 mg calcium per 100 ml plasma.

14. The meat product of claim 12 wherein said meat product is beef.

15. A method according to claim 1 wherein the vitamin D is administered in an amount sufficient to increase $\mu$-calpain activity during postmortem aging of said meat.

16. The meat product of claim 12 wherein said meat product has a uniform tenderness.

17. The meat product of claim 12 wherein said meat product remains palatable after the tenderization process.

* * * * *